United States Patent
Menzio

(10) Patent No.: US 6,684,488 B2
(45) Date of Patent: Feb. 3, 2004

(54) LINE OF MANUFACTURING UNITS FOR CARRYING OUT MACHINING OPERATIONS, PROVIDED WITH MODULAR TRANSLATING DEVICES FOR THE TRANSFER OF WORKPIECES FORM ONE UNIT TO ANOTHER OF THE LINE

(75) Inventor: Danilo Menzio, Grugliasco (IT)

(73) Assignee: Comau SpA, Grugliasco (IL)

( * ) Notice: Subject to any disclaimer, the term of this patent is extended or adjusted under 35 U.S.C. 154(b) by 0 days.

(21) Appl. No.: 10/170,648

(22) Filed: Jun. 14, 2002

(65) Prior Publication Data

US 2002/0189085 A1 Dec. 19, 2002

(30) Foreign Application Priority Data

Jun. 15, 2001 (IT) ..................................... TO2001A0575

(51) Int. Cl.[7] .............................................. B23P 21/00
(52) U.S. Cl. .......................................... 29/711; 29/430
(58) Field of Search ........................... 29/430, 711, 822, 29/823

(56) References Cited

U.S. PATENT DOCUMENTS

| | | | | |
|---|---|---|---|---|
| 4,609,093 A | * | 9/1986 | Taketani et al. ............ | 198/378 |
| 4,646,915 A | * | 3/1987 | Ohtaki et al. ............ | 198/346.2 |
| 4,720,231 A | * | 1/1988 | Pienta ........................ | 414/560 |
| 4,723,356 A | * | 2/1988 | Sakamoto et al. ............ | 29/714 |
| 4,734,979 A | * | 4/1988 | Sakamoto et al. ............ | 29/822 |
| 4,894,909 A | * | 1/1990 | Sakamoto et al. ............ | 29/719 |
| 4,924,996 A | * | 5/1990 | Svensson et al. ...... | 198/341.05 |
| 4,937,929 A | * | 7/1990 | Nokajima et al. ............ | 29/430 |
| 5,005,274 A | * | 4/1991 | Timell ........................ | 29/33 P |
| 5,177,862 A | * | 1/1993 | Speece ........................ | 29/824 |
| 5,226,211 A | * | 7/1993 | Jones ........................ | 29/559 |
| 5,472,503 A | * | 12/1995 | Birchler ........................ | 118/423 |
| 5,522,275 A | * | 6/1996 | Mauletti .................. | 74/490.03 |
| 5,943,768 A | * | 8/1999 | Ray ............................. | 29/822 |
| 6,109,424 A | * | 8/2000 | Doan ...................... | 198/468.8 |
| 6,409,438 B1 | * | 6/2002 | Kohler ........................ | 409/131 |
| 6,502,294 B2 | * | 1/2003 | Kusmierczyk et al. ......... | 29/430 |
| 6,564,440 B2 | * | 5/2003 | Oldford et al. .......... | 29/407.01 |
| 6,591,488 B1 | * | 7/2003 | Tachibana .................... | 29/783 |
| 6,595,407 B2 | * | 7/2003 | McNamara et al. ........ | 228/212 |

* cited by examiner

Primary Examiner—Gregory Vidovich
Assistant Examiner—Essama Omgba
(74) Attorney, Agent, or Firm—Sughrue Mion, PLLC

(57) ABSTRACT

A line of manufacturing units for carrying out a sequence of machining operations on a set of workpieces, which are fed in, in succession, at one loading end of the line and proceed along the line up to an unloading end of the line, comprises means for transfer of the workpieces along the line, the said means including a fixture made up of a plurality of horizontal supporting and guide beams, which are set in a superelevated position and which extend one on the prolongation of the other in the longitudinal direction of the line. Each superelevated beam carries a first mobile slide on top of it, upon which is in turn mounted a vertical upright (or a second mobile slide, which can move vertically), at the bottom end of which there is mounted a pick-up device, which can be oriented about a vertical axis. The movements of the various transfer devices are coordinated in such a way that, when one manufacturing unit terminates its cycle of operations on a piece, the transfer devices upstream and downstream of said unit are already close thereto for picking up the workpiece that has undergone machining and for loading a new workpiece.

7 Claims, 3 Drawing Sheets

LINE OF MANUFACTURING UNITS FOR CARRYING OUT MACHINING OPERATIONS, PROVIDED WITH MODULAR TRANSLATING DEVICES FOR THE TRANSFER OF WORKPIECES FORM ONE UNIT TO ANOTHER OF THE LINE

BACKGROUND OF THE INVENTION

The present invention relates to a line of manufacturing units for carrying out a sequence of machining operations on a set of workpieces, which are fed in, in succession, at one loading end of the line and proceed along the line up to an unloading end of the line, in which said line comprises means for transfer of the workpieces from the end for loading onto the first unit in the line, from each unit of the line to the next, and from the last unit in the line to the unloading end.

In lines of the kind referred to above, which are made up of a succession of manufacturing units or work centres, it is already general knowledge that it is possible to have available devices for transfer of the workpieces from one unit to another on the line. In more traditional systems, transfer devices are provided, which simultaneously cause all the workpieces that are on the line to advance by one step along the line. This traditional solution is, however, not particularly efficient. In general, in fact, the various units along the line carry out cycles of operations of different duration. With a rigid transfer system of the type described above, it is, however, necessary for all the units to have completed their respective cycles of operations in order to be able to start carrying out the step of transfer of each piece from one unit to another. In addition, the rigid transfer system according to conventional techniques enables only limited variations in the angular position of the piece during its transfer. The piece may, in fact, normally translate only in a position where it is resting on a surface or, more in general, in conditions of stability of its centre of gravity, and can, at the most, only turn about a vertical axis, unless auxiliary devices are added, designed for turning the workpiece upside down before or after the travel of transfer.

In the past, there have been proposed transfer devices of a flexible type, in which between each unit of the line and the next there is set a transfer device, which operates independently from the other transfer devices in order to reduce dead time as much as possible during the production cycle. The present applicant has, for example, presented various robotic solutions (see, for example, the U.S. Pat. No. 5,522,275) designed for transferring workpieces between the workstations of a production line of any type. Of course, transfer devices in the form of robots present the drawback of being relatively costly and cumbersome and of penalizing accessibility and cleanliness of their working areas, and hence are not always suitable for application to a line of machining centres. On the other hand, there is increasingly felt the need to step up productivity, particularly in the automobile field, also following upon the trend that has appeared in the last few years of concentrating a number of production sites in a single plant.

In the specific field of lines for carrying out machining (for instance, a production line for cylinder heads for motor-vehicle engines), the need for high productivity is always accompanied by the need for maximum reduction in production costs. A solution of a line of machining centres provided with devices for transfer of workpieces from one unit to another in the line is described in the Japanese patent application JP-A-11 114 783. This known device envisages transfer devices, each of which is made up of a pair of arms, which are mounted in an articulated way, underneath, about a horizontal axis and oscillate with their top ends through a vertical arc between two end positions, one end being adjacent to one unit of the line set upstream of the transfer device and the other end being adjacent to a second unit of the line set downstream of the transfer device. This known solution presents the drawback of being relatively complicated and of not being efficient. In particular, in so far as the pieces are transferred along an arched path and consequently must be raised from the starting position to reach the apex of the arc, with a consequent useless expenditure of energy. A further drawback of the aforesaid known solution lies in the fact that the transfer devices are mounted on the floor, on which the line is set out, and consequently entail an encumbrance which reduces accessibility to the various units in the line. A further drawback of the above known solution is that the workpiece can be transferred only in a single position. In addition, there is a penalization in terms of accessibility and of the possibility of cleaning the working area, as well as the requirement that the workpiece must be fixed on a dedicated pallet, specifically shaped for the workpiece that is to be transferred.

SUMMARY OF THE INVENTION

The purpose of the present invention is to provide a line of manufacturing units for carrying out machining operations with removal of stock, which will be equipped with means for transferring workpieces from one unit to another in the line and which will be able to overcome all the drawbacks of the prior art that have been discussed above.

With a view to achieving the above purpose, the subject of the invention is a line of manufacturing units of the type referred to at the beginning of this description, characterized in that the aforesaid transfer means include:

a fixture made up of a plurality of horizontal supporting and guide beams, which are set in a superelevated position with respect to the floor on which the line is set, said beams extending in the longitudinal direction of the line, each one of which in a position corresponding to a space comprised between one manufacturing unit and another adjacent one;

a transfer device mounted on each of the aforesaid supporting and guide beams, said device comprising:

a first mobile slide, which can move along the respective supporting and guide beam in the longitudinal direction of the line;

a vertical upright mounted upon said first mobile slide, which, in one example of embodiment, constitutes a second mobile slide, which can move vertically;

pick-up means, which are mounted on the bottom end of said second slide or upright and which can be oriented about a vertical axis;

motor means for controlling the first slide, second slide (if provided) and said pick-up means; and control means designed for controlling the motor means of the various transfer devices of the line independently of one another, but according to a sequence preferably co-ordinated together in such a way that, when any single manufacturing unit has terminated its cycle of operations on a piece, the transfer device downstream of said unit is already waiting nearby to pick up the workpiece that has undergone machining, and the transfer device upstream of the unit is already waiting nearby, with a new workpiece loaded upon it, in order to be able to unload it onto the unit so that it will undergo the corresponding operating cycle.

Preferably, the various manufacturing units have respective orientable tables for supporting the workpiece, and the aforesaid superelevated horizontal supporting and guide beams of the various transfer devices substantially all extend at the same height and are arranged substantially so that one is on the prolongation of the other.

Thanks to the above-mentioned characteristics, the transfer means with which the line according to the invention is equipped are made up of modular translating devices, which enable the operations of transfer of the workpieces from one unit of the line to another to be carried out in an extremely efficient manner, with an extremely simple and low-cost structure as compared to a system which uses robots. The various transfer devices have a modular structure, which can be easily reconfigured according to the specific requirements of the line. Since the transfer devices are mobile on superelevated beams, they do not entail any additional encumbrance which might constitute an obstacle to accessibility to the units of the line or render cleaning operations more problematical. The transfer of the pieces from one unit to another can be carried out without causing the workpiece being transferred to undergo substantial variations in height, so as to simplify equipping for carrying out transfer operations (a vertical upright may be sufficient instead of the second vertically mobile slide) and to avoid high power absorption by the motor means associated to the transfer devices.

According to a further preferred characteristic, there can be associated to one or more transfer devices magazines for the accumulation of the workpieces, where the transfer device can provisionally deposit a workpiece, whilst waiting for the manufacturing unit downstream thereof to become free, or else can carry out on the piece inter-operational checks in order to guarantee the quality of the piece undergoing machining.

By accordingly prearranging the pick-up device, it is moreover possible to perform an action of turning the piece over, i.e., setting it in an upside-down position, in order to discharge any chips or swarf ("chip dump") and cutting liquid that may have accumulated inside the piece during the previous machining phase, without having to add sophisticated and cumbersome devices, as instead is necessary with other known solutions.

Owing to its characteristics, the transfer device which forms part of the line according to the invention is suited for handling pieces of any shape and ones set in any position.

BRIEF DESCRIPTION OF THE DRAWINGS

Further characteristics and advantages of the present invention will emerge from the ensuing description, with reference to the attached drawings, which are provided purely by way of non-limiting example, and in which.

DETAILED DESCRIPTION OF THE INVENTION

FIGS. 1–4 illustrate, by way of example, a machining line comprising four workstations made up of as many manufacturing units or work centres 10, 20, 30, 40 designed for carrying out in succession a sequence of machining operations on a set of workpieces P which are fed along the line. The line further comprises a loading end I and an unloading end O made up of respective supporting structures, which include, for example, respective roller surfaces designed to receive the workpieces P which enter and exit the line.

Figure 5:
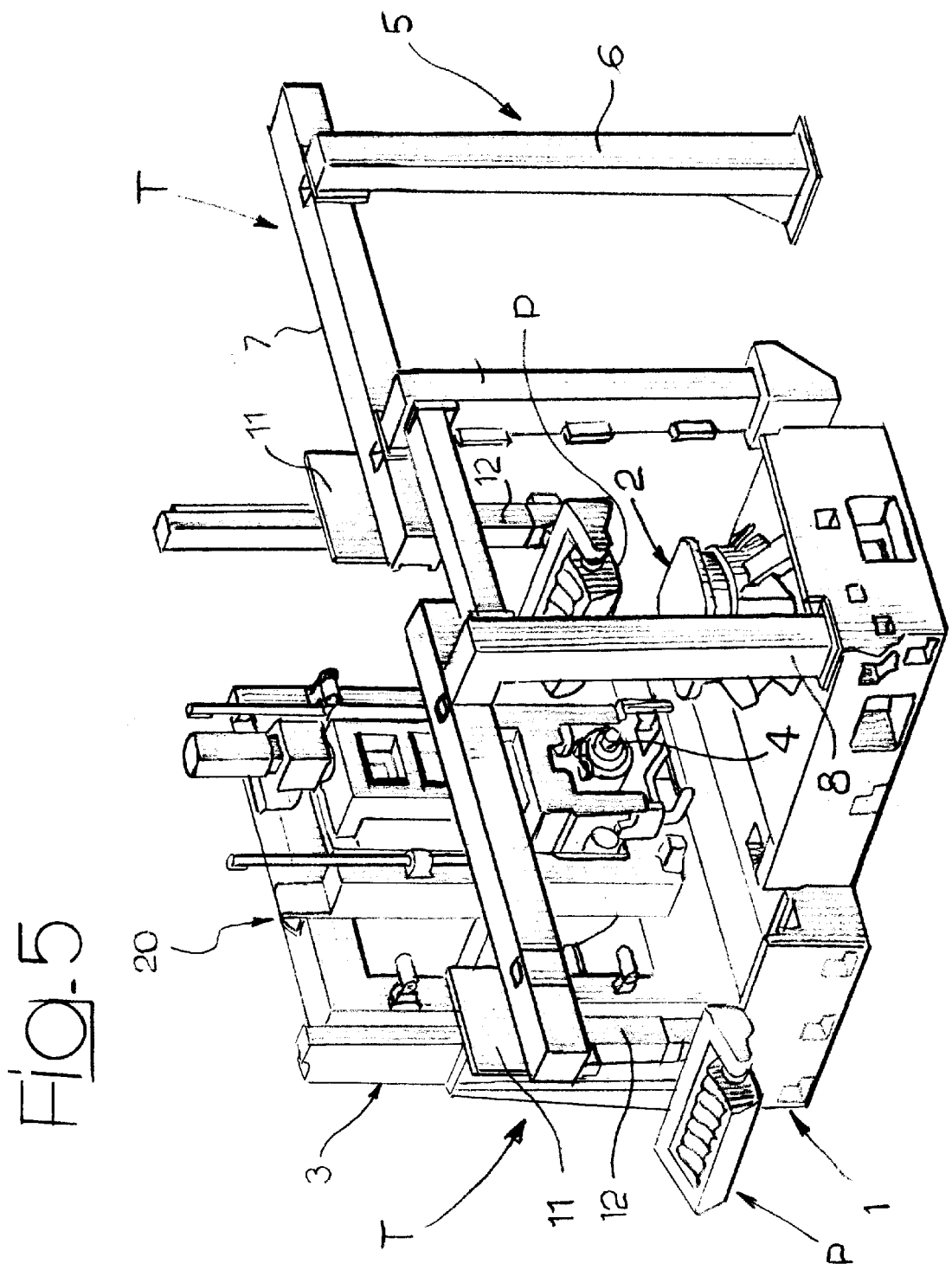
FIG. 5 is a perspective view of an example of embodiment of a manufacturing unit which forms part of the line according to the invention, with the transfer devices set one upstream and the other downstream of the manufacturing unit.

Each of the manufacturing units 10, 20, 30, 40 can be made in any known way. FIG. 5 illustrates, purely by way of example, a possible embodiment of each of the manufacturing units, with specific reference to the manufacturing unit 20. This unit consists of a work centre, which includes a base 1 on which there is set a table 2, preferably of the kind that can turn about a vertical axis, designed to receive and support the piece undergoing machining (in the case of the example illustrated in FIG. 5 the pieces P are cylinder heads for motor-vehicle engines). Again in the case of the example illustrated in FIG. 5, anchored on the base 1 is a supporting framework 3, on which a set of mutually slidable slides is mounted in cascaded fashion, the said slides enabling displacement, along three mutually orthogonal axes, of a rotary spindle 4, which is designed to bring the tool (for example, a drilling tool or milling tool), that is to carry out a series of operations, onto the piece positioned on the table 2.

In the present description and in the ensuing claims, the architecture of each manufacturing unit 20 is not described in detail, in so far as this structure can be made in any known way and, in itself, does not fall within the scope of the present invention. For the purposes of the present invention, the important feature is that each manufacturing unit 20 has a workpiece table 2 and a spindle that can move on a number of axes (for example, five) for carrying out the machining operations on the piece located on the workpiece table.

In order to transfer the pieces from one unit to another on the line, the invention envisages a plurality of modular transfer devices T arranged between one unit and another, as well as between the loading end I and the first unit 10, and between the last unit 40 and the unloading end O. Each modular transfer device T includes a supporting fixture 5, which is firmly anchored to the fixed framework 3 of each unit adjacent to it. Basically, the fixture 5 comprises at least one metal column 6 and at least one superelevated horizontal beam 7, which, as will be seen, has the function of support and guide for the transfer device T and which is anchored to the top of the column 6, as well as, for instance, to a column 8 forming part of the fixed framework 3 of the respective unit.

Figure 6:
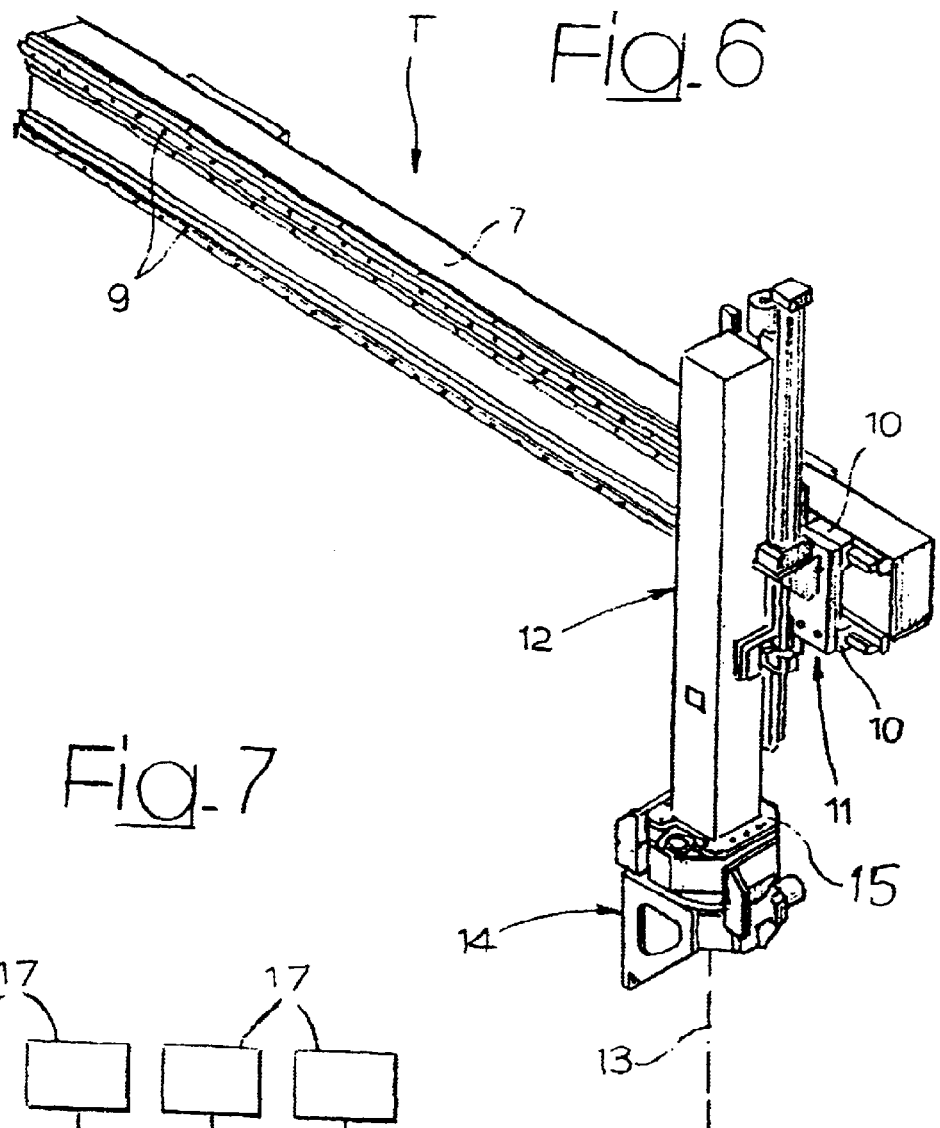
FIG. 6 is a perspective view of an embodiment of a single transfer device.
Figure 7:
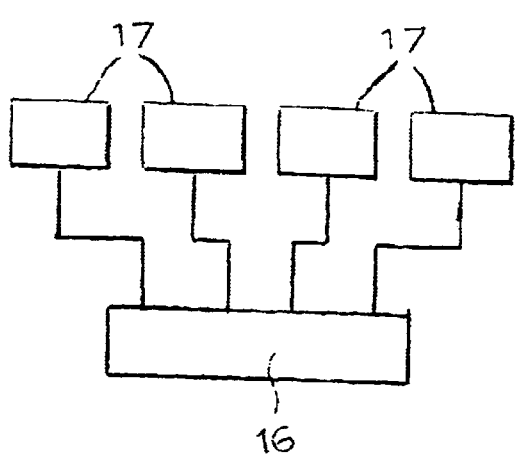
FIG. 7 is a block diagram which illustrates the control system for controlling the transfer devices according to the invention.

As may be seen in detail in FIG. 6, each superelevated horizontal beam 7 carries guides 9, on which are mounted sliding pads 10 carried by a first slide 11, which is thus displaceable along the beam 7. As may be seen in FIGS. 1–5, the various superelevated horizontal beams 7 of the transfer devices T are all arranged substantially at the same height and are all substantially set one on the prolongation of another, in the longitudinal direction of the line. With reference, once again, to FIG. 6, in the case of the example illustrated, mounted so that it can slide in a vertical direction on the first slide 11 is a second slide 12 (which, however, could also be replaced by a fixed upright), the bottom end of which carries, in such a way that it can turn about a vertical axis 13, a device 14 for picking up a workpiece, fixed to the flange 15, this device being of any known type and preferably shaped to enable the piece to be turned upside down. In FIG. 6, the motor means that control translation of the first slide 11, translation of the second slide 12 and rotation of the pick-up device 14, as well as the actuator means mounted on board the device 14 for activating or deactivating the pick-up members and possible reversal of the piece with which it is provided are not illustrated in detail, in so far as they can be made in any known way and do not, in themselves, fall within the scope of the invention. Furthermore, the elimination of the above details from the drawings, renders the latter more readily and more easily understandable. In FIG. 7, the blocks 17 indicate schematically the various motor/actuator means with which each transfer device T is equipped, which are controlled by an electronic control unit 16, which simultaneously controls also the motor/actuator means of all the other transfer devices T of the line. Purely by way of example, it is pointed out, however, that the motor means associated to the slides 11, 12 may be represented by linear electric motors, or else by traditional electric motors associated to internal-thread/external-thread systems.

During operation of the line, the transfer devices T (see FIGS. 1–4) transfer the pieces from one manufacturing unit to another, feeding them along the line. The various transfer devices T are controlled by the unit 16 in a way that they are completely independent from one another, yet, in a co-ordinated way to enable—when a cycle of operations on the piece that is in a given unit of the line is completed—the two transfer devices set upstream and downstream of the unit in question to be already adjacent to the workpiece table 2 in order to pick up the machined piece, carrying it into the next unit on the line and, at the same time, to load a new workpiece to be machined onto the previous unit.

Figure 1:
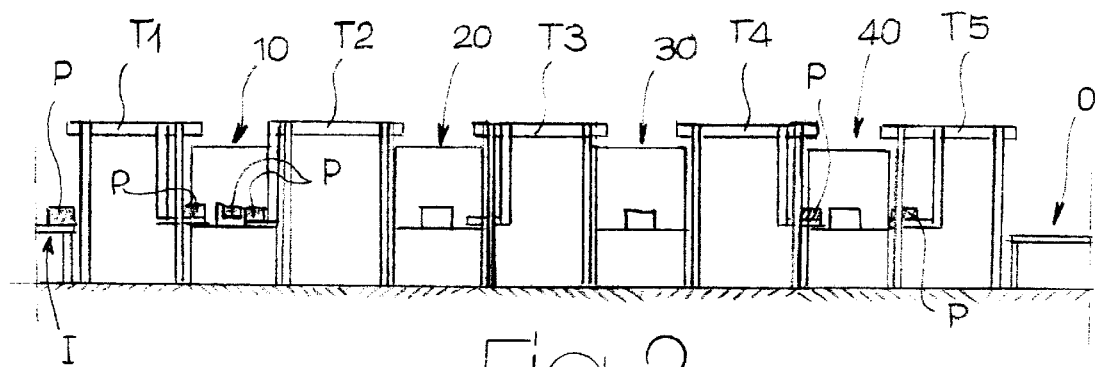
FIGS. 1 to 4 are schematic perspective views illustrating an embodiment of the line according to the invention in four successive, different, operating conditions.

FIG. 1 illustrates, by way of example, an operating condition of the line, in which the units 20, 30 are working, whilst the unit 10 has just terminated machining of the piece that was on it, so that the transfer device designated by T2 is ready to pick the piece up, whilst the transfer device T1 is ready with a new piece to be loaded into the unit 10. Simultaneously, the unit 40 has terminated its cycle of operations, so that the transfer device T5 is about to transfer the previously machined piece onto the unloading end O, whilst the transfer device T4 is loading a new piece to be machined onto the unit 40.

Figure 2:
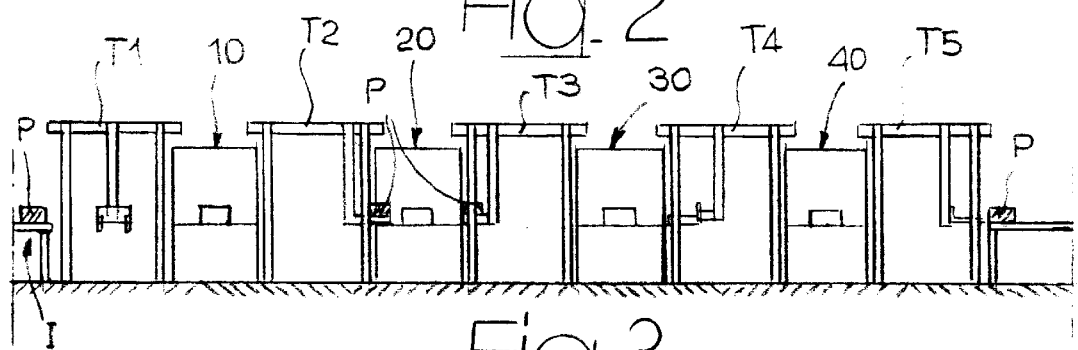
Figure 3:
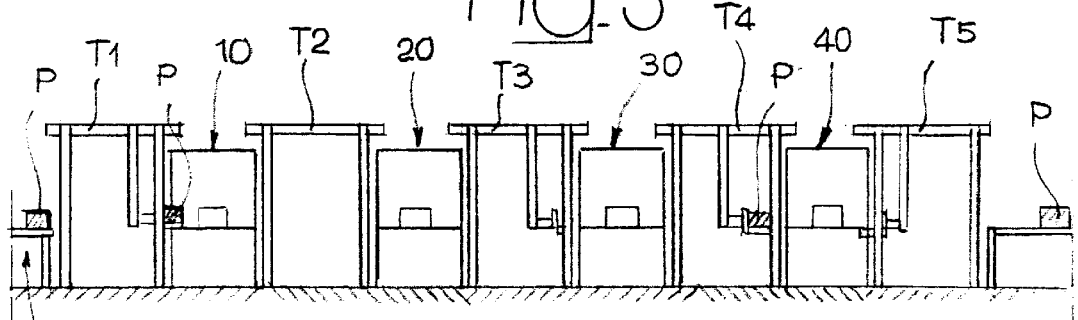

FIG. 2 illustrates a situation that follows upon the previous one, in which the transfer device T1 is returning to the loading end I for loading of a new piece. The unit 10 is working in so far as the device T2 has brought the piece previously picked up from the unit 10 into the vicinity of the unit 20. The transfer device T3 has just picked up the workpiece previously machined by the unit 20. The units 30 and 40 are working, and the transfer device T5 is unloading the piece previously machined in the unit 40 at the output end O. In the next situation, illustrated in FIG. 3, the transfer device T1 is ready for loading a new piece onto the unit 10, the unit 20 is working, the transfer device T3 is unloading the previously machined piece from the unit 20 onto the unit 30, which can thus start working, and the transfer devices T4 and T5 are adjacent to the unit 40. One device, T5, is waiting for the piece to be completed in order to pick it up from the unit 40, and the other device, T4, is waiting to load a new piece onto the unit 40.

Figure 4:
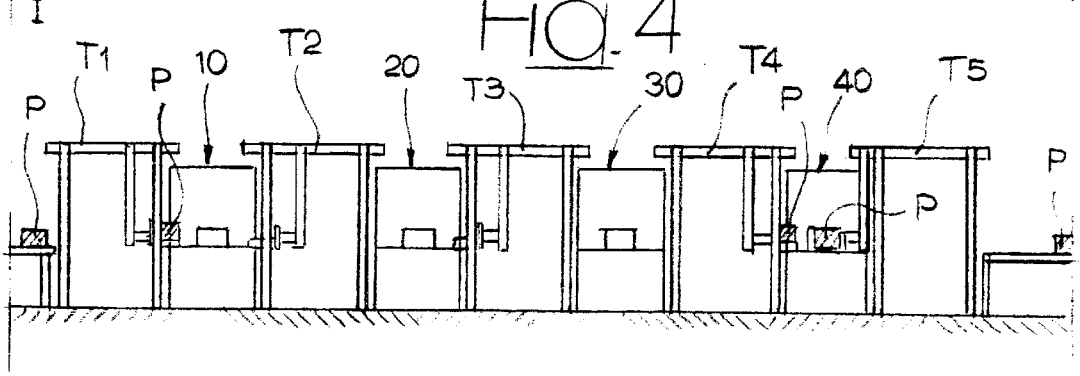

FIG. 4 illustrates yet another subsequent situation, in which the transfer device T1 is about to load a new piece onto the unit 10. The units 20 and 30 are working. The transfer device T5 is picking up the previously machined piece from the unit 40 to unload it at output from the line, whilst the transfer device T4 is ready to load a new piece onto the unit 40.

Consequently, as may be seen, in the successive steps of the machining cycle of the line that have been described above, some manufacturing units are working on their respective pieces, whilst the others are loading or unloading the workpiece. In addition, it may be seen how the piece that is to undergo machining travels sequentially from position I to the units 10, 20, 30, 40, to be then deposited in the output position O. The transfer devices associated to the units use the time that must, in any case, elapse to enable the units that are working to complete their operations, in order to arrange the workpieces immediately adjacent to the subsequent workstations, where they are to be unloaded. Consequently, the transfer devices according to the present invention enable control of operation of the line in an optimal way, reducing to a minimum the dead time. Basically, the cycle time of the line becomes the cycle time of the unit of the line that is to carry out the longest operation. At the same time, the structure of the transfer devices T is extremely simple and inexpensive. The arrangement of the fixture made up of the column 6 and the superelevated beam 7 is extremely simple and enables easy reconfigurations of the system according to the requirements and the space available. Since each transfer device T is in a superelevated position, the possibility of access to the various manufacturing units is total, with consequent advantages in terms of execution of cleaning operations and/or maintenance operations. The transfer devices according to the invention also involve small overall dimensions and hence little encumbrance between one manufacturing unit and another, such as to enable considerable reduction in the overall dimensions of the line. As mentioned already, the system can be prearranged for transferring the workpieces from one unit to another by getting them to follow a path free from substantial variations in height, so as to avoid any waste of energy for lifting the pieces. In the example illustrated, the beams 7 of the transfer devices T are all substantially at the same height, as can be clearly seen from FIGS. 1 to 5.

Of course, without prejudice to the principle of the invention, the details of construction and the embodiments may vary widely with respect to what is described and illustrated herein purely by way of example, without thereby departing from the scope of the present invention.

What is claimed is:

1. A line of manufacturing units for carrying out a sequence of machining operations on a set of workpieces, which are fed in, in succession, at one loading end of the line and proceed along the line up to an unloading end of the line,
    in which said line comprises means for transfer of the workpieces from the loading end to a first unit of the line, from each unit to the next one in the line, and from the last unit in the line to the unloading end,
    wherein said transfer means include:
        a fixture made up of a plurality of horizontal supporting and guide beams, which are set in a superelevated position with respect to the floor on which the line is set, said beans extending in a longitudinal direction of the line, each one of which in a position corresponding to a space comprised between one manufacturing unit and another adjacent one;
        a transfer device mounted on each of the aforesaid supporting and guide beams, said device comprising:
            a first mobile slide, which can move along the respective supporting and guide beam in the longitudinal direction of the line;
            a vertical upright mounted upon said first mobile slide;

pick-up means, which are mounted on a bottom end of said vertical upright and which can be oriented about a vertical axis;

motor means for controlling the first slide and said pick-up means of each transfer device; and control means designed for controlling the motor means of each transfer device of the line independently of one another, but according to a sequence co-ordinated together.

2. The line according to claim 1, wherein said vertical upright constitutes a second slide, which is mobile in a vertical direction on said first slide, said motor means being provided also for controlling the movement of said second slide.

3. The line according to claim 1, wherein said control means are designed for controlling the motor means of transfer device, in such a way that, when any single manufacturing unit has terminated its cycle of operations on a workpiece, the transfer device downstream of said unit is already waiting nearby to pick up the machined workpiece, and the transfer device set upstream of the unit is already waiting nearby to load a new workpiece thereon.

4. The line according to claim 1, wherein the various manufacturing units have respective tables for supporting the workpiece that is undergoing machining, the said tables each being mounted in an orientable way about a vertical axis.

5. The line according to claim 1, wherein the superelevated supporting and guide beams of the various transfer devices all extend substantially at the same height and are set substantially one on the prolongedation of another.

6. The line according to claim 5, wherein the fixture of each transfer device comprises a column and the aforesaid horizontal superelevated beam.

7. The line according to claim 1, wherein said pick-up means are designed to turn the piece picked up upside down.

* * * * *